United States Patent
Jia et al.

(10) Patent No.: US 10,832,250 B2
(45) Date of Patent: Nov. 10, 2020

(54) LONG-TERM SHORT-TERM CASCADE MODELING FOR FRAUD DETECTION

(71) Applicant: MICROSOFT TECHNOLOGY LICENSING, LLC, Redmond, WA (US)

(72) Inventors: Yuting Jia, Redmond, WA (US); Shoou-Jiun Wang, Sammamish, WA (US); Cezary Marcjan, Redmond, WA (US); Jayaram N M Nanduri, Issaquah, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 497 days.

(21) Appl. No.: 15/683,094

(22) Filed: Aug. 22, 2017

(65) Prior Publication Data

US 2019/0066109 A1 Feb. 28, 2019

(51) Int. Cl.
*G06Q 20/40* (2012.01)
*G06Q 40/02* (2012.01)
*G06N 20/00* (2019.01)

(52) U.S. Cl.
CPC ......... *G06Q 20/4016* (2013.01); *G06N 20/00* (2019.01); *G06Q 40/02* (2013.01)

(58) Field of Classification Search
CPC .. G06Q 20/4016; G06Q 20/405; G06Q 40/02; G06Q 20/24; G06Q 20/389; G06Q 20/4014; G06Q 20/409; G06Q 20/42; G06Q 20/00
See application file for complete search history.

(56) References Cited

U.S. PATENT DOCUMENTS

| 5,819,226 A | 10/1998 | Gopinathan et al. |
| 7,263,506 B2 | 8/2007 | Lee et al. |
| 7,668,776 B1 * | 2/2010 | Ahles ............... G06Q 20/108 |
| | | 235/379 |
| 8,805,737 B1 | 8/2014 | Chen et al. |
| 2011/0055074 A1 | 3/2011 | Chen et al. |

(Continued)

FOREIGN PATENT DOCUMENTS

WO   WO-2015138272 A1 * 9/2015 ........... G06Q 10/067

OTHER PUBLICATIONS

Zhang et al.: Categorizing and Mining Concept Drifting Data Streams, Aug. 2008, ACM, pp. 812-820 (Year: 2008).*

(Continued)

*Primary Examiner* — Bijendra K Shrestha
(74) *Attorney, Agent, or Firm* — Workman Nydegger

(57) ABSTRACT

Embodiments disclosed herein are related to computing systems and methods for determining a risk score for a plurality of data transactions. In the embodiments, a first risk score module may receive data transactions. The first risk score module may then determine a first risk score for each of the data transactions. A second risk score module that is different from the first risk score module may receive each of the first risk scores determined by the first risk score module as an input. The second risk score module may determine a second risk score based in part on the input first risk scores for each of the data transactions. The second risk scores may specify if each of the data transactions is to be approved or rejected by the computing system.

20 Claims, 5 Drawing Sheets

(56) References Cited

U.S. PATENT DOCUMENTS

| | | | | |
|---|---|---|---|---|
| 2012/0197802 A1* | 8/2012 | Smith | ............... | G06Q 20/12 |
| | | | | 705/44 |
| 2013/0204755 A1* | 8/2013 | Zoldi | ............... | G06Q 20/4016 |
| | | | | 705/30 |
| 2014/0180974 A1* | 6/2014 | Kennel | ............... | G06N 7/005 |
| | | | | 706/12 |
| 2015/0046332 A1* | 2/2015 | Adjaoute | ............... | G06N 5/043 |
| | | | | 705/44 |
| 2015/0262184 A1* | 9/2015 | Wang | ............... | G06Q 20/4016 |
| | | | | 705/44 |
| 2016/0253672 A1* | 9/2016 | Hunter | ............... | G06Q 20/4016 |
| | | | | 705/39 |
| 2018/0101676 A1* | 4/2018 | Bailey | ............... | H04L 63/1433 |

OTHER PUBLICATIONS

Bacry et al.: Continuous cascade models for asset returns, Apr. 2006, pp. 1-31 (Year: 2006).*

Capgemini: Predictive Modeling Using Transactional Data, 2008, pp. 1-12 (Year: 2008).*

Vlasselaer, et al., "APATE: A novel approach for automated credit card transaction fraud detection using network-based extensions", In Journal of Decision Support Systems, vol. 75, Jul. 31, 2015, pp. 38-48.

* cited by examiner

LONG-TERM SHORT-TERM CASCADE MODELING FOR FRAUD DETECTION

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been, and are being, developed in all shapes and sizes with varying capabilities. As such, many individuals and families alike have begun using multiple computer systems throughout a given day.

For instance, computer systems are now used in ecommerce and the like as individuals increasing perform financial transactions such as making a purchase from various vendors over the Internet. In order to perform the financial transactions, the individuals are typically required to provide a payment instrument such as a credit card or bank account information such as a checking account to the vendor over the Internet. The vendor then uses the payment instrument to complete the transaction.

The process of providing the payment instrument over the Internet leaves the various merchants subject to loss from fraudulent transactions. For example, when a fraudulent payment instrument is used to purchase a product, the merchants often loses the costs associated with the product. This is often because the bank or financial institution that issues the payment instrument holds the merchants responsible for the loss since it was the merchants who approved the transaction at the point of sale where payment instrument is not present.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems and methods for determining a risk score for a number of data transactions. In the embodiments, a first risk score module may receive data transactions. The first risk score module may then determine a first risk score for each of the data transactions. A second risk score module that is different from the first risk score module may receive each of the first risk scores determined by the first risk score module as an input. The second risk score module may determine a second risk score based in part on the input first risk scores for each of the data transactions. The second risk scores may specify if each of the data transactions is to be approved or rejected by the computing system.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
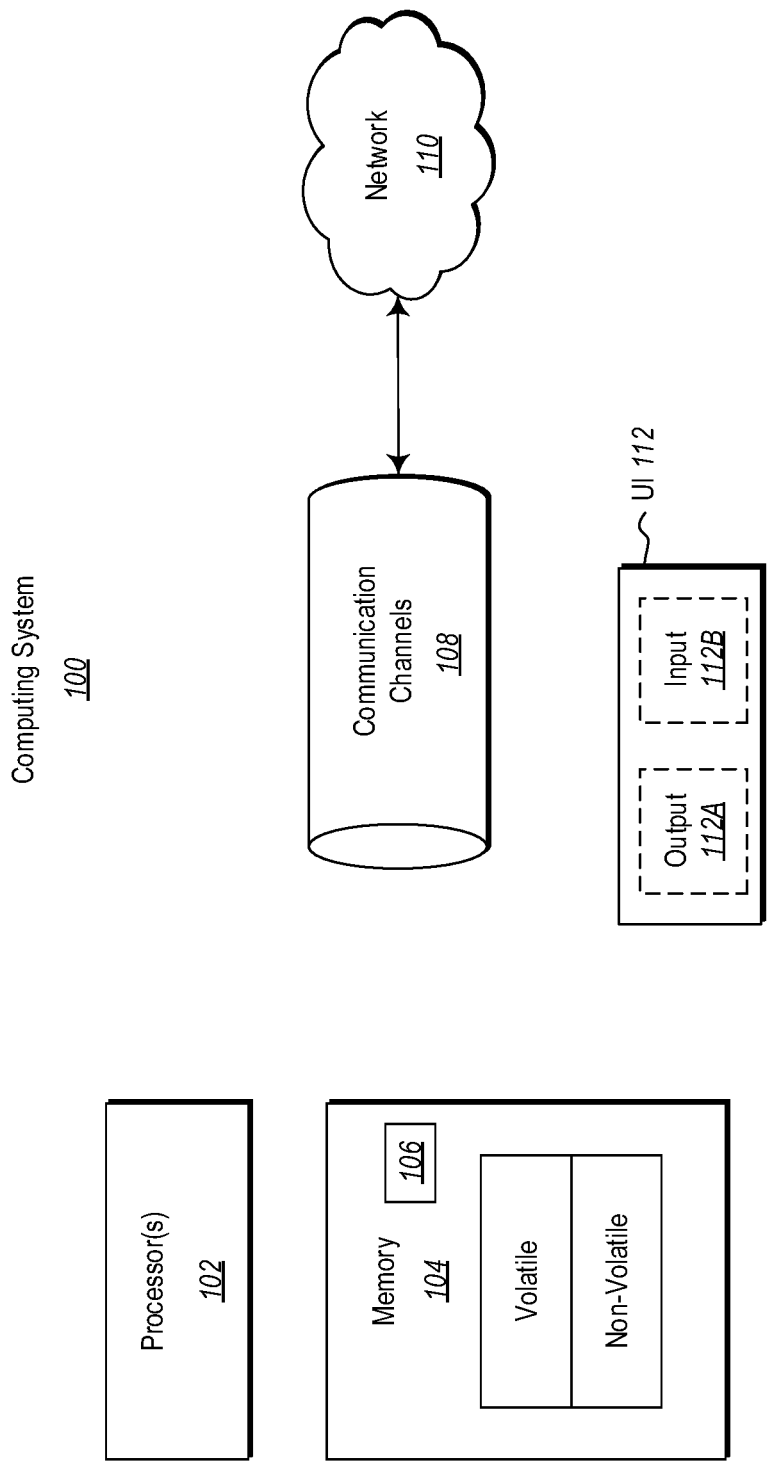
FIG. 1 illustrates an example computing system in which the principles described herein may be employed.

Fraud is as old as humanity itself and can take various forms. Moreover, new technology development provides additional ways for criminals to commit fraud. For instance, in e-commerce the information on a card is enough to perpetrate a fraud. As EMV becomes ubiquitous, fraud at physical storefronts is evolving as well—driving a movement from counterfeit card fraud to new account fraud. Growing online retail volume have brought greater opportunity to criminals—pushing fraud to card-not-present channels.

The changes in fraudulent activities and customer behavior are the main contributors to the non-stationarity in the stream of transactions. This situation is typically referred to as "concept drift" and is of extreme relevance to detection models which must be constantly updated either by exploiting the recent supervised samples or by forgetting the outdated information that might be of no further use except misleading. Those fraud solution strategies not updated or revisited frequently enough often lose their predictive accuracy in the long term.

Another issue that may impact the prediction power of fraud detection models is the so-called "selection bias and reject inference". From the point-of-view of merchants, no true labels were on the rejected transactions by merchants or banks.

Advantageously, the embodiments disclosed herein are related to providing fraud detection that accounts for "concept drift" and "selection bias and reject inference". This is done by using a cascade model of a long term fraud model and a short term fraud model to determine a risk score that may be a probability that is indicative of whether a given data transaction is a good transaction that should be approved or is a fraudulent or bad transaction that should be rejected. The long term risk score determined by the long term risk model is used as an input to the short term risk model, which may then determine an overall final risk score.

In one embodiment, a first risk score module may receive data transactions. The first risk score module may then determine a first risk score for each of the data transactions. A second risk score module that is different from the first risk score module may receive each of the first risk scores determined by the first risk score module as an input. The second risk score module may determine a second risk score based in part on the input first risk scores for each of the data transactions. The second risk scores may specify if each of the data transactions is to be approved or rejected by the computing system.

There are various technical effects and benefits that can be achieved by implementing aspects of the disclosed embodiments. By way of example, it is now possible to use short term data in the determination of a data transaction risk scores to account for "concept drift" and "selection bias and reject inference". It is also now possible to calibrate and train the short and long term risk models. Further, the technical effects related to the disclosed embodiments can also include improved user convenience and efficiency gains.

Some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2A:
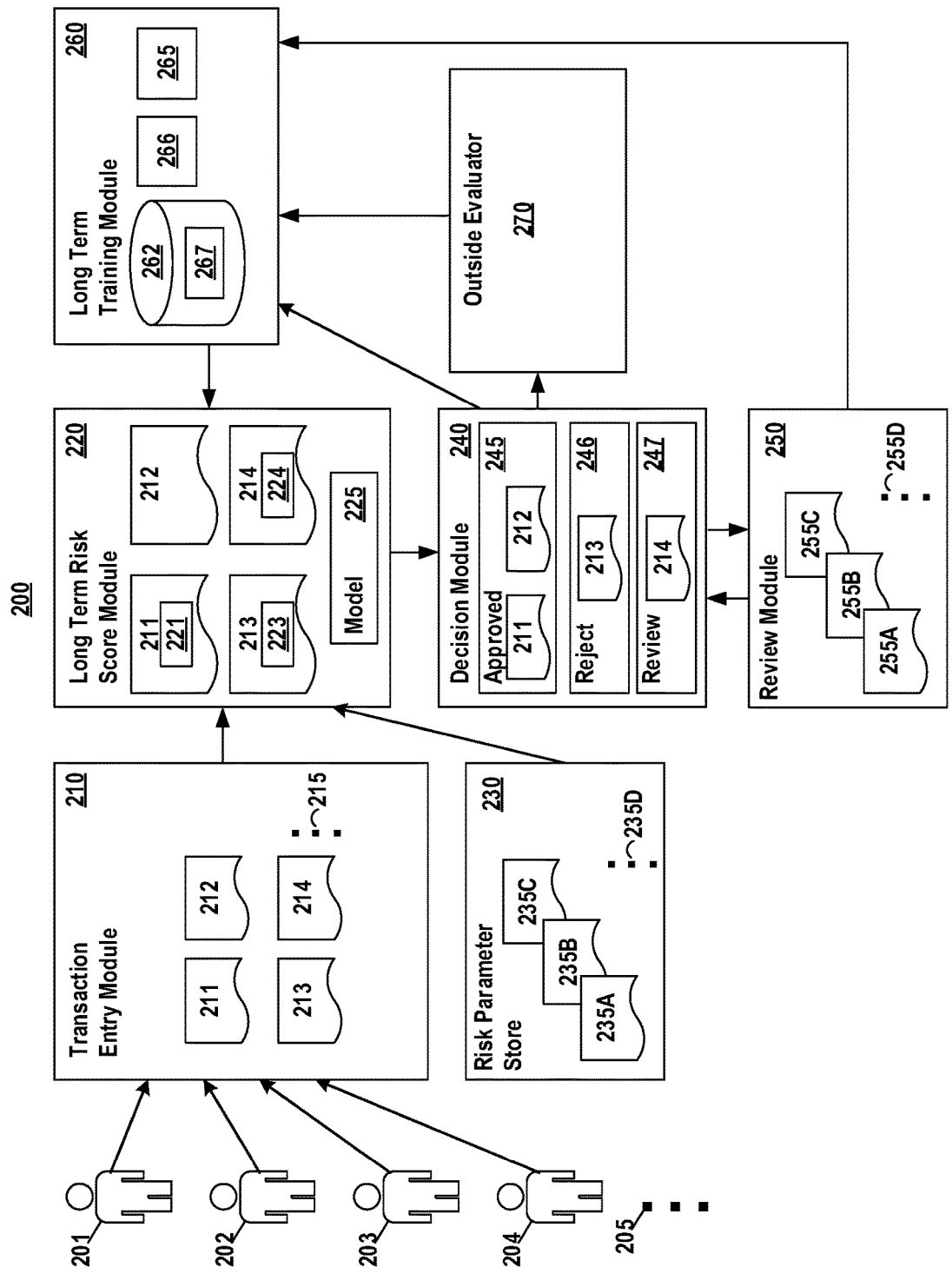
FIG. 2A illustrates a computing system that may implement the embodiments disclosed herein.
Figure 2B:
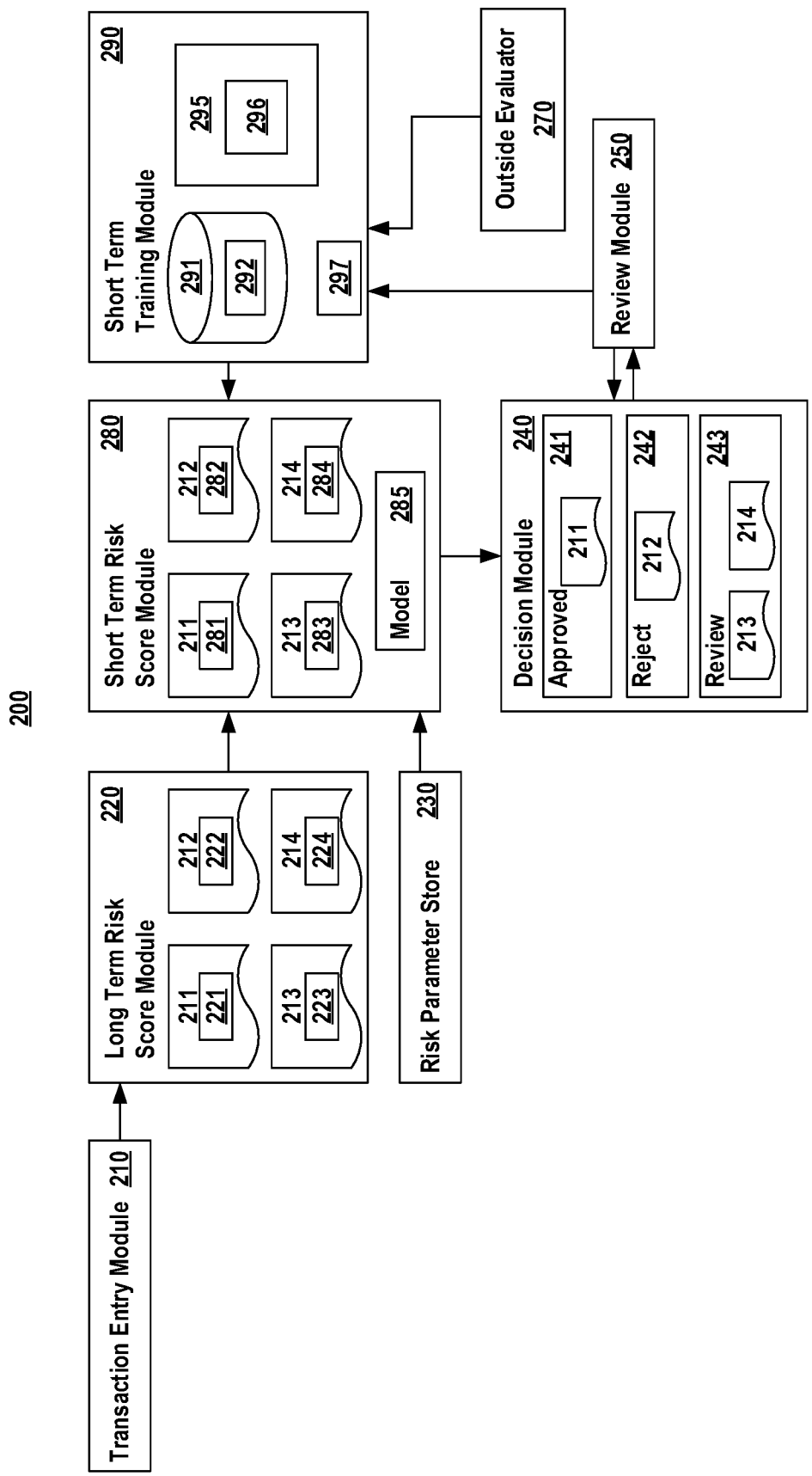
FIG. 2B illustrates an extended view of the computing system of FIG. 2A.

Attention is now given to FIGS. 2A and 2B, which illustrate an embodiment of a computing system 200, which may correspond to the computing system 100 previously described. The computing system 200 includes various components or functional blocks that may implement the various embodiments disclosed herein as will be explained. The various components or functional blocks of computing system 200 may be implemented on a local computing system or may be implemented on a distributed computing system that includes elements resident in the cloud or that implement aspects of cloud computing. The various components or functional blocks of the computing system 200 may be implemented as software, hardware, or a combination of software and hardware. The computing system 200 may include more or less than the components illustrated in FIGS. 2A and 2B and some of the components may be combined as circumstances warrant. Although not necessarily illustrated, the various components of the computing system 200 may access and/or utilize a processor and memory, such as processor 102 and memory 104, as needed to perform their various functions.

As shown in FIG. 2A, the computing system 200 may include a transaction entry module 210. In operation, the transaction module 210 may receive input from multiple users 201, 202, 203, 204, and any number of additional users as illustrated by the ellipses 205 to initiate a data transaction that is performed by the computing system 200. For example, the user 201 may initiate a data transaction 211, the user 202 may initiate a data transaction 212, the user 203 may initiate a data transaction 213, and the user 214 may initiate a data transaction 204. The ellipses 215 represent any number of additional data transactions that can be initiated by one or more of the users 205. Of course, it will be noted that in some embodiments a single user or a number of users less than is illustrated may initiate more than one of the transactions 211-215.

The data transactions 211-215 may represent various data transactions. For example, as will be explained in more detail to follow, the data transactions 211-215 may be purchase or other financial transactions. In another embodiments, the transactions 211-215 may be transactions related to clinical or scientific research results. In still, other embodiments, the transactions 211-215 may be any type of transaction that is subject to fraud and is thus able to be characterized as being properly approved, improperly approved, properly rejected, or improperly rejected as a result of the fraud. Accordingly, the embodiments disclosed herein are not related to any type of data transactions. Thus, the embodiments disclosed herein relate to more than purchase or financial transactions and should not be limited or analyzed as only being related to purchase or financial transactions.

The transaction entry module 210 may receive or determine information about each of the data transactions 211-215. For example, if the data transactions 211-215 are purchase or other financial transactions, then the transaction entry module 210 may determine personal information about the user, payment information such as a credit or debit card number, and perhaps the product that is being purchased. If the data transactions are clinical or scientific research data transactions, then the data transaction entry module 210 may determine identifying information about the research such as participant information and result information. The transaction entry module 210 may receive or determine other information about other types of data transactions as circumstances warrant.

The computing system 200 may also include a long term risk score module 220. In operation, the long term risk score module 220 may determine a long term risk score for each of the data transactions 211-215 based on one or more risk determination models 225. The long term risk scores may be a probability that is indicative of whether a given data transaction is a good transaction that should be approved or is a fraudulent or bad transaction that should be rejected. In one embodiment, the risk determination model 225 may be a gradient boosting decision tree, while in other embodiments the risk determination model 225 may be an artificial neural network or some other type of risk determination model. Accordingly, it will be appreciated that the embodiments disclosed herein are not limited by a particular type of risk determination model 225. The long term risk score module 220 is considered a "long term" module because it may be trained using a longer time period of data, such as a year, as will be explained in more detail to follow.

As mentioned, the long term risk score module 220 may determine a long term risk score for each of the data transactions 211-215 based on one or more risk determination models 225. For example, the score module may determine a long term risk score 221 for the data transaction 211, a long term risk score 222 for the data transaction 212, a long term risk score 223 for the data transaction 213, and a long term risk score 224 for the data transaction 214. The long term risk score module 220 may also determine a long term risk score for each of the additional data transactions 215. As will be explained in more detail to follow, the long term risk scores 221-224 may specify if each of the data transactions 211-215 is to be approved (i.e., the data transactions are performed or completed), if the transactions are to be rejected (i.e., the data transactions are not completed or performed) or if further review is needed to determine if the data transaction should be approved or rejected.

In some embodiments, the determination of the long term risk scores may be based at least in part on one or more risk parameters that are related to the data transactions 211-215. For example, as illustrated in FIG. 2A, the computing system may include a risk parameter store 230. Although shown as being an independent, the risk parameter store 230 may be part of another element of the computing system 200.

As shown, the risk store 230 may include a first risk parameter 235a, a second risk parameter 235b, a third risk parameter 235c, and any number of additional risk parameters as illustrated by the ellipses 235d. The risk parameters may be also be referred to hereinafter as risk parameters 235. In some embodiments, the risk parameters may also be referred to as a "feature", "input variable", or "attribution".

In the embodiment related to the purchase or other financial transactions, the risk parameters 235 may be related to the product or service being purchased and to the purchaser of the product and service. For example, the first risk parameter 235a may specify a purchase price for the product or service, the second risk parameter 235b may specify the past payment history of the purchaser of the product and service, and a third risk parameter 235c may specify a profit margin for each transaction for the seller of the product or service. Other risk parameters 235d such as location of the data transaction may also be used. As will be appreciated, the various risk parameters may be those parameters that would likely indicate how trustworthy the purchaser of the product and service is and how much harm the seller of the product or service would suffer is the transaction were fraudulent as these types of parameters are relevant to risk.

In the embodiment related to the to the clinical or scientific research results, the risk parameters 235 may specify the amount of error that is acceptable, the research goals, and other relevant factors. These may be used by the risk score module 220 as needed. In other embodiments, various other risk parameters 235 may be used as needed by the risk score module 220.

Figure 3:
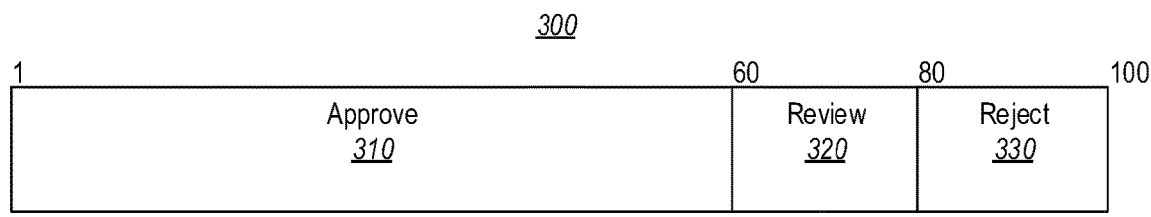
FIG. 3 illustrates an embodiment of a risk score band.

The computing system 200 may further include a decision module 240 that in operation uses the long term risk scores 221-224 to determine if a data transaction should be approved, rejected or subjected to further review based on the long term risk score. That is, the decision module 240 may set or otherwise determine a risk score cutoff or boundary for risk scores that will be approved, risk scores that will rejected, and risk scores that will be subjected to further review. For example, FIG. 3 shows risk scores from 1 to 100. As illustrated, those data transactions (i.e., data transactions 211-214) that are assigned a risk score (i.e., risk scores 221-224) between 1 and 60 are included in an approve portion 310 and those data transactions that are assigned a risk score from 80 to 100 are included in a rejected portion 330. However, those data transactions having a risk score between 60 and 80 are included in a review portion 320 that are to be subjected to further review. Thus, in the embodiment the risk score 60 is a first cutoff or boundary and the risk score 80 is a second cutoff or boundary. It will be noted the FIG. 3 is only one example of possible risk scores and should not be used to limit the embodiments disclosed herein.

As illustrated in FIG. 2A, it is shown at 245 that the data transactions 211 and 212 have been approved because the risk scores 221 and 222 were in the risk score band that should be approved. For instance, in relation to the embodiment of FIG. 3 the risk scores 221 and 222 may be between 1 and 60. Accordingly, the data transactions are able to be completed by the computing system 200. The data transaction 213, on the other hand, is shown at 246 as being rejected because the risk score 223 was in the risk score band that should be rejected. For instance, in relation to the embodiment of FIG. 3 the risk score 223 was between 80 and 100. Accordingly, the data transaction is not completed by the computing system 200.

As further shown in FIG. 2A at 247, the data transaction 214 has been marked for further review because the risk score 224 was in the risk score band that should be subjected to further review. For instance, in relation to the embodiment of FIG. 3 the risk score 224 was between 60 and 80. Accordingly, the computing system 200 may also include a review module 250, which may be a computing entity or a human entity that utilizes the review module 240. In operation, the review module 250 receives the data transaction 214 and performs further review on the data transaction to determine if the data transaction should be approved or rejected. For example, the review module may apply one or more additional review criteria 255A, 255B, 255C, and any number of additional review criteria as illustrated by ellipses 255D (hereinafter also referred to "additional review criteria 255"). In some embodiments the additional review criteria 255 may be to review of social media accounts of the initiator of the data transaction, review and/or contact of third parties associated with the initiator of the data transaction, contact with a credit card company that issues a credit card associated with the initiator of the data transaction, or direct contact with the initiator of the data transaction through a phone call, SMS, email, or other real time (or near real time) forms of communication. It will be appreciated that there may be other types of additional review criteria.

Based on the results of the additional review criteria 255, the review module 250 may determine if the data transaction 214 should be approved or rejected. For example, if the additional review criteria indicate that it is likely that the data transition 214 is a valid, non-fraudulent transaction, then the data transaction 214 may be approved. On the other hand, if the additional review criteria indicate that it is likely that the data transition 214 is a fraudulent transaction, the data transaction may be rejected. The determination of the review module may be provided to the decision module 240 and the data transaction 214 may be added to the approved data transactions 245 and allowed to be completed or added to the rejected data transactions 246 and not allowed to be completed.

The computing system 200 may include a long term training module 260 that is able to train the long term risk module 220 and its accompanying one or more risk models 225. In operation, the long term training module 260 includes or otherwise has access to a database 261 that stores data 262 related to data transactions 211-215 that have been completed or rejected based on the long term risk scores 221-224 that were assigned to the data transactions by the long term score module using the risk model 225.

As shown in FIG. 2A, the long term training module 260 may receive the data 262 regarding whether the data transactions were approved or rejected from the decision module 240. As may be appreciated, the determination module is able to report which of the data transactions were approved, which were sent for further review and which were rejected. The review module 250 may also provide data 262 that specifies which of the data transactions that were subjected to the further review were ultimately approved or rejected. The long term training module 260 may receive the data 262 from other sources as well when circumstances warrant.

In some embodiments, the long term training module 260 may receive data 262 from an outside evaluator 270. The outside evaluator may be a bank or the like that determines that a data transaction approved by the decision module should have been rejected because the payment source used in the data transaction was fraudulently used or obtained. In such case, the outside evaluator may notify the long term training module 260 that the data transaction should have been rejected, for example by providing chargebacks to the owner of the computing system 200.

The long term training module 260 may include a training module 265 that is able to use the data 262 to determine if the model 225 is providing a proper long term risk score. This information may then be used to train the model 225 so as to further refine the model's ability to properly determine a long term risk score. The training module 265 may train the model 225 in any reasonable manner.

As may be appreciated, those data transactions, such as data transactions 211 and 212 which were approved by the decision module 240 based on the long term risk score may be performed by the computing system 200. Thus, in the embodiment where the data transactions are a purchase or other financial transaction the computing system may perform the purchase by receiving payment from the user and then providing the product to the user. In such case, the training module 265 is able to determine if a data transaction was properly approved, which is if the user actually paid for the product. The training module 265 is also able to determine if a data transaction was improperly approved, that is if the user provided a fraudulent payment instrument and received a chargeback from the outside evaluator 270.

However, the data transactions such as data transaction 213 that are rejected by decision module 240 based on the long term risk score are not actually performed or completed by the computing system 200. Accordingly, to determine if these transactions were properly rejected or not, the long term training module may include or otherwise have access to a sampling module 266. In operation, the sampling module 266 randomly approves a subset of the data transactions that scored to be rejected so that the data transactions are approved. The sampling module 266 may then sample this subset to determine the outcome of the data transaction.

For example, in the embodiment where the data transactions are a purchase or other financial transaction, the sampling module 266 may determine how many data transactions in the subset were properly completed, that is the user paid for the product. Since these were successful data transactions, they were improperly rejected. Likewise, the sampling module 266 may determine how many data transactions in the subset were not properly completed, that is the user paid for the product by a fraudulent means and were thus properly rejected. The sampling module 266 may then use statistical analysis based on the subset to determine if the remaining data transactions that were rejected based on the long term risk score were properly rejected or not.

As previously mentioned, the long term risk score module 220 is considered a "long term" module because it may be trained using a longer time period of data. In other words, the data 262 may be collected at the database 261 for a longer period of time and then used by the training module 265 in training the model 225. In one embodiment, the data 262 may be collected over a period of one year. Collecting the data over the period of one year allows for changes in seasonal patterns to be observed in the data. For example, during the holiday season in November and December there may be an increase in data transactions and a corresponding increase in attempted fraud. Alternatively, the types of data transactions may change at different times during the year. Thus, having the training module 265 use data 262 that is collected over the period of one year allows the training module 265 to account for any seasonal variations in the data transactions 211-215. Of course, it will be appreciated that the longer time period that the data 262 is collected may be more or less than a year as circumstances warrant. Thus, the embodiments disclosed herein are limited by any specific time period of data 262 collection.

In some embodiments, the amount of the data 262 that is collected over the course of a year may be quite large. Accordingly, in such embodiments the training module 265 may divide the data into several segments and may then do the training on each of the segments. Probability calibration may also be performed to ensure that the training of each of the different segments produces an output with similar meaning.

Although the long term risk score module 220 and its accompanying risk determination model 225 are generally able to properly detect fraud and thus assign a risk score that properly rejects a fraudulent data transaction, changes often occur in user 201-205 behavior and also in any fraudulent activity that might attempted by one or more of the users 201-205. If such changes, which may be referred to as "concept drift" are not accounted for, then the ability of the long term risk score module 220 to properly detect fraudulent data transactions may diminish over time. In addition, the long term risk score module 220 may become subject to "selection bias and reject inference" where the model 225 begins to focus too much on certain types of data transactions and not enough on other types. If this becomes known, it may be exploited by fraudsters as a way to avoid detection of fraudulent transactions.

Advantageously, the embodiments disclosed herein provide for a short term risk score module 280 that is cascaded with the long term risk score module 220 so as to account for "concept drift" and "selection bias and reject inference" in the final risk score assigned to each data transaction as will be described in more detail to follow. FIG. 2B illustrates an extended view of the computing system 200. Accordingly, those elements of computing system 200 already discussed in relation to FIG. 2A may not be described further in relation to FIG. 2B. As shown in FIG. 2B, the computing system 200 may include the short term risk score module 280. In operation, the short term risk score module 280 receives the risk scores 221-224 generated as previously described by the long term risk score module 220 as an input and then assigns a final risk score to the data transactions based on this input. The short term risk score module 280 may determine the final risk scores for each of the data transactions 211-215 based on one or more risk determination models 285. The final risk scores may be a probability that is indicative of whether a given data transaction is a good transaction that should be approved or is a fraudulent or bad transaction that should be rejected. In one embodiment, the risk determination model 285 may be the same as the risk determination model 225 and may be a gradient boosting decision tree, an artificial neural network, or some other type of risk determination model. Accordingly, it will be appreciated that the embodiments disclosed herein are not limited by a particular type of risk determination model 285. The short term risk score module 280 is considered a "short term" module because it may be trained using a short time period of data as will be explained in more detail to follow.

As mentioned, the short term risk score module 280 may determine a final risk score for each of the data transactions 211-215 based on one or more risk determination models 285 and based on the received long term risk scores. For example, the score module may determine a final risk score 281 for the data transaction 211 based on the long term risk score 221, a final risk score 282 for the data transaction 212 based on the long term risk score 222, a final risk score 283 for the data transaction 213 based on the long term risk score 223, and a final risk score 284 for the data transaction 214 based on the long term risk score 224. The short term risk score module 280 may also determine a final risk score for each of the additional data transactions 215. Like the long term risk scores, the final risk scores 281-284 may also specify if each of the data transactions 211-215 is to be approved (i.e., the data transactions are performed or completed), if the transactions are to be rejected (i.e., the data transactions are not completed or performed) or if further review is needed to determine if the data transaction should be approved or rejected.

In some embodiments, the determination of the final risk scores may be based at least in part on the risk parameters 235 that are related to the data transactions 211-215. For example, the risk parameters 235 may be provided to the short term risk score module 280 and used in the determination of the final risk scores.

Once the final risk scores 281-284 have been determined for each of the data transactions 211-214, the decision module 240 may use the final risk scores 281-284 to determine if a data transaction should be approved, rejected or subjected to further review based on the long term risk scores. That is, the decision module 240 may set or otherwise determine a risk score cutoff or boundary for final risk scores that will be approved, final risk scores that will rejected, and final risk scores that will be subjected to further review in a manner similar to that described in relation to the long term risk scores. It will be appreciated that in the embodiments implementing the short term risk score module 280, the decision module 240 may use the final risk scores when making the real time decision as to which data transactions to approve, reject, or subject to further review. In such cases, the determination made using the long term risk scores may be used in training the long term risk score module 220, but are not used in the real time determination. In other words, where both the long term risk score module and the short term risk score module are used, there is only one real time determination that is made and that is based on the final risk scores. However, the long term risk scores are used as inputs to determine the final risk scores and they are also used in training the long term risk score module.

As illustrated in FIG. 2B, it is shown at 241 that the data transactions 211 has been approved because the risk score 281 was in the risk score band that should be approved. Accordingly, the data transaction 211 is able to be completed by the computing system 200. The data transaction 212 on the other hand, is shown at 242 as being rejected because the risk score 283 was in the risk score band that should be rejected. Accordingly, the data transaction is not completed by the computing system 200.

As further shown in FIG. 2B at 243, the data transactions 213 and 214 have been marked for further review because the risk scores 282 and 284 were in the risk score band that should be subjected to further review. It will be noted that the data transaction 211 was approved when the decision module 240 used the long term risk score 222 as the basis of its decision. However, using the final risk score 282 as the basis for the decision, the data transaction is now subject to further review. This shows that using both the long and short term risk score modules to determine the final risk score may result in a different risk score result than if the long term risk score model is used by itself. In this case, it is possible that some form of "concept drift" or "selection bias" has crept into the long term model 225 and this has been accounted for by the short term model 285 when determining the final risk score 282.

The review module 250 may receive the data transactions 212 and 214 and performs further review on the data transactions using the additional review criteria 255 to determine if these data transaction should be approved or rejected. This process may be performed in the manner previously described in relation to review module 250.

The computing system 200 may also include a short term training module 290 that is able to train the short term risk score module 280 and its accompanying one or more risk models 285. In operation, the short term training module 290 includes or otherwise has access to a database 291 that stores data 292 related to data transactions 211-215 that have been completed or rejected based on the final risk scores 281-284 that were assigned to the data transactions by the short term score module using the risk model 285. In some embodiments, the database 291 may be the same as the data base 261, although this is not required.

The data 292 may be data that is collected over a shorter period of time than the data 262. For example, as mentioned previously the data 262 may be collected over the period of one year. The data 292, however, may be collected over a short period of time such as the most recent month or perhaps two weeks. In this way, any changes in fraudulent activity may be quickly accounted for. Accordingly, the short term training module 290 may be considered "short term" since it a "short term" module because it may be trained using a shorter time period than the long term module.

As shown in FIG. 2B, the long term training module 260 may receive the data 262 regarding whether the data transactions were approved or rejected from the decision module 240. As may be appreciated, the determination module is able to report which of the data transactions were approved, which were sent for further review and which were rejected. The review module 250 may also provide data 262 that specifies which of the data transactions that were subjected to the further review were ultimately approved or rejected. The long term training module 260 may receive the data 262 from other sources as well when circumstances warrant.

In some embodiments, the short term training module 290 may receive data 292 from the outside evaluator 270. In such case, the outside evaluator 270 may notify the short term training module 290 that the data transaction should have been rejected, for example by providing chargebacks to the owner of the computing system 200.

The short term training module 290 may include a training module 295 that is able to use the data 292 to determine if the model 285 is providing a proper final risk score. This information may then be used to train the model 285 so as to further refine the model's ability to properly determine the final risk score.

As may be appreciated, those data transactions, such as data transaction 211 which was approved by the decision module 240 based on the final risk score may be performed by the computing system 200. Thus, in the embodiment where the data transactions are a purchase or other financial transaction the computing system may perform the purchase by receiving payment from the user and then providing the product to the user. In such case, the training module 295 is able to determine if a data transaction was properly approved, which is if the user actually paid for the product. The training module 295 is also able to determine if a data transaction was improperly approved, that is if the user provided a fraudulent payment instrument and did not pay.

However, the data transactions such as data transaction 213 that are rejected by decision module 240 based on the final risk score are not actually performed or completed by the computing system 200. Accordingly, to determine if these transactions were properly rejected or not, the long term training module may include or otherwise have access to a sampling module 297. In operation, the sampling module 297 randomly approves a subset of the data transactions that scored to be rejected so that the data transactions are approved. The sampling module 297 may then sample this subset to determine the outcome of the data transaction in the manner previously described in relation to sampling module 266.

The training module 295 may train the model 285 in any reasonable manner. However, in one embodiment, the training module 295 may use various tags and weights when training the model 285. For example, the data 292 provided by the outside evaluator 270 may be set with a weight w that is larger than 2. Data transactions that are determined to be bad due to the manual review provided by the review module 250 are set with a weight w that is w/2. Finally, those data transactions that are rejected and that have a higher long term risk score than the final risk score are set with a weight w that is n*score/200, where the score range is between 0 and 100 as discussed in FIG. 3.

It will be appreciated that the long term training module is able to use a large and clean data set when doing its training that is very stable given the large size of the data. However, the short term training module trains the model 285 using recently collected data 292, which may not be as stable. Accordingly, the training module 295 may include a calibration module 296 that is used to ensure that the distribution of the final risk scores are similar to that of the long term risk score.

Figure 4:
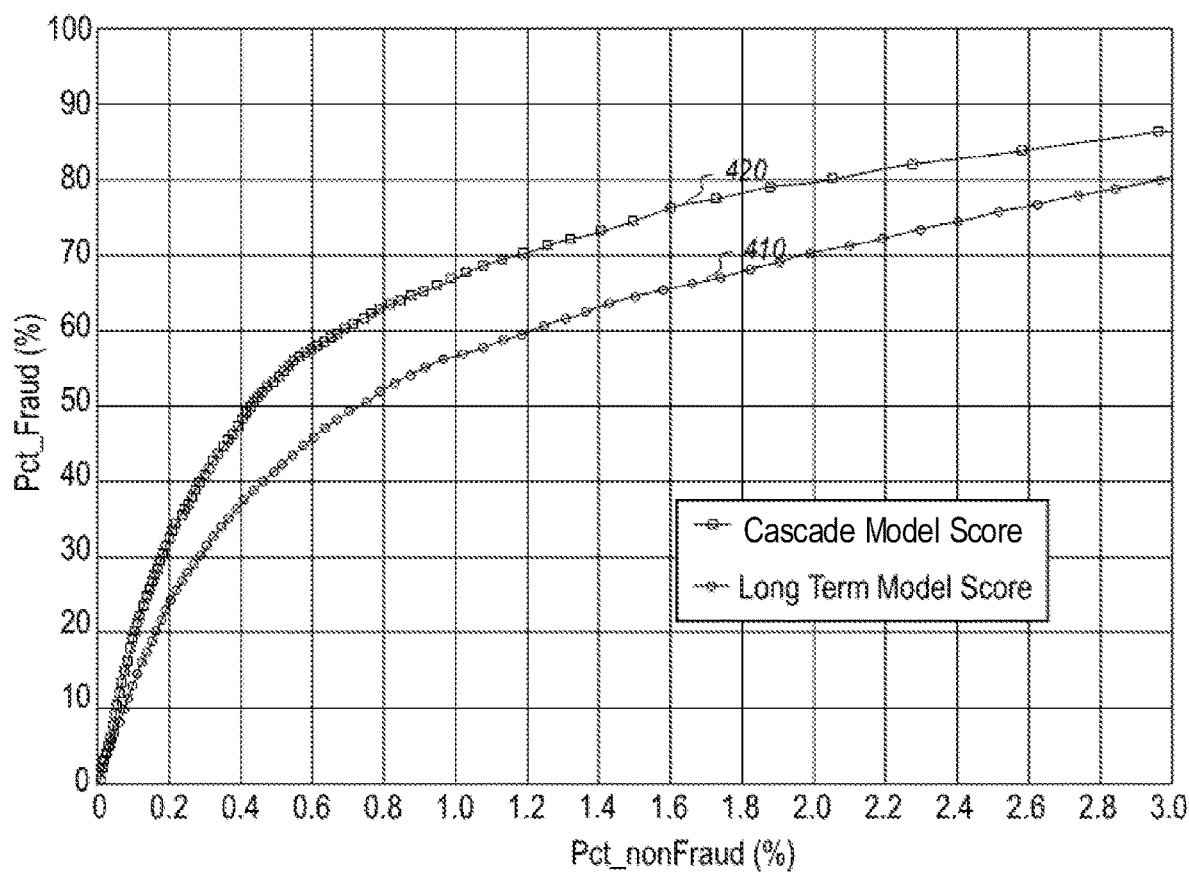
FIG. 4 illustrates a graph that shows the performance of computing system when only using a long term risk score module and when using a cascade of the long term risk score module and a short term risk score module.

In one embodiment, the calibration module 296 may perform the following when performing the calibration:
1) Convert the raw final risk score (ranging from 0 to 1) to integer by multiplying 100;
2) Calculate the percentiles (named as q(raw score 99), q(raw score 98), and etc) for scores 99, 98, . . . , 20 since only care about the higher risk score range is important;
3) Rank order the long term risk scores (ranged 0 to 100) of the same data and get the average of long term risk scores (denote avg_99, avg_98, etc) for each percentile bin, in terms of percentile q(raw score 99), between q(raw score 98) and q(raw score 99), and etc. In the case that the volume of data points is too small, the small bins can be combined;
4) Now denote $x=\ln(s/(100-s))$, $y=\ln(avg\_s/(100-avg\_s))$ for s=99 to 20. Then a linear regression using y as the dependent variable and x as the explanatory variable may be performed. Let a be the intercept and b be the slope;
5) The calibrated final score=$1/(1+EXP(a+b*\ln(raw\ score/(1-raw\ score)))$ FIG. 4 shows a graph that illustrates the performance of computing system 200 when only using the long term risk score module 260 and when using the cascade of the long term risk score module 260 and the short term risk score module 280. As illustrated, FIG. 4 illustrates non-fraudulent data transactions on the x-axis and fraudulent transactions on the y-axis. Plot 410 shows the performance of computing system 200 when only using the long term risk score module 260. Plot 420 shows the performance of the computing system when using the cascade of the long term risk score module 260 and the short term risk score module 280. A comparison of the two plots shows that the cascade model is able to better detect fraudulent activity.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
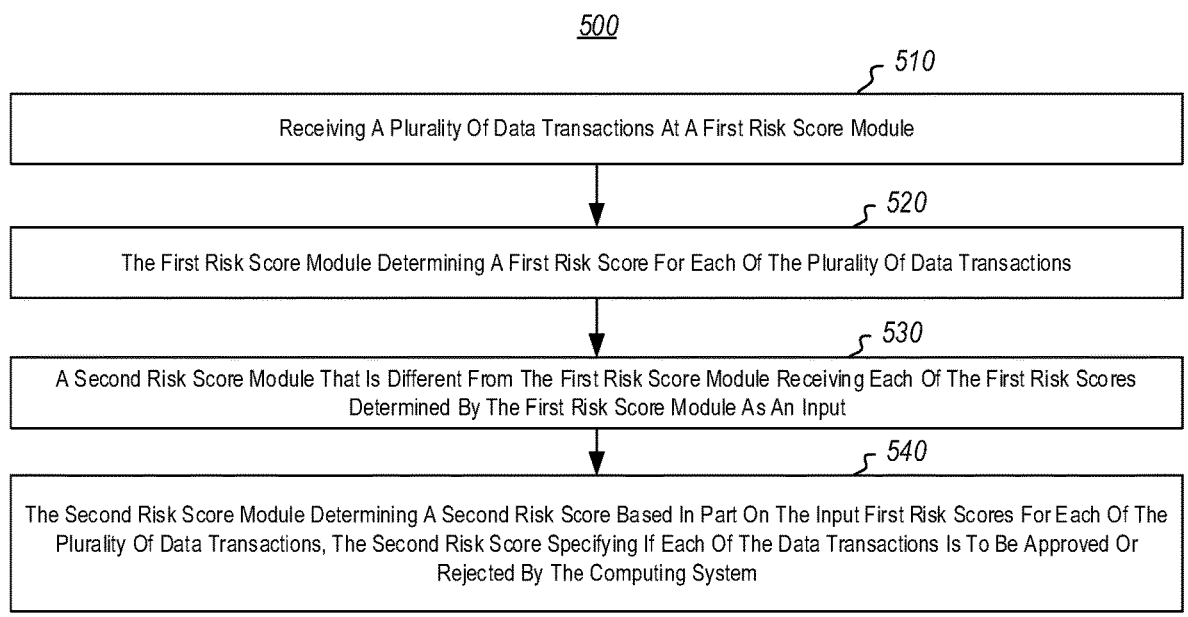
FIG. 5 illustrates a flow chart of an example method for determining a risk score for a plurality of data transactions

FIG. 5 illustrates a flow chart of an example method 500 determining a risk score for a plurality of data transactions. The method 500 will be described with respect to one or more of FIGS. 2-4 discussed previously.

The method 500 includes receiving a plurality of data transactions at a first risk score module (act 510). For example as previously described the data transactions 211-215 may be received at the long term risk score module 220 via the transaction entry module 210. The data transactions 211-215 may be any type of data transaction.

The method 500 includes the first risk score module determining a first risk score for each of the plurality of data transactions (act 520). For example as previously described the long term risk score module 220 may determine the long term risk scores 221-224 for the data transactions 211-214. The long term risk scores 221-224 may be determined in the manner discussed previously, for example through use of the risk model 225.

The method 500 includes a second risk score module that is different from the first risk score module receiving each of the first risk scores determined by the first risk score module as an input (act 530). For example as previously described the short term risk score module 280 may receive the long term risk scores 221-224 as input.

The method 500 includes the second risk score module determining a second risk score based in part on the input first risk scores for each of the plurality of data transactions (act 540). The second risk score may specify if each of the data transactions is to be approved or rejected by the computing system. For example, as previously described the short term risk module 280 may determine the short term risk scores 281-284 for the data transactions 211-214. The short term risk scores 281-284 may be determined in the manner discussed previously, for example through use of the risk model 285. The short term risk scores 281-284 may then specify to the decision module 240 if the data transactions are to be approved or rejected or in some embodiments subjected to further review.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for determining a risk score for a plurality of data transactions, the computing system comprising:
at least one processor;
a computer readable hardware storage device having stored thereon computer-executable instructions which, when executed by the at least one processor, cause the computing system to perform the following:
an act of receiving a plurality of data transactions at a first risk score module, the first risk score module being a long-term risk score module with respect to a second risk score module;
an act of the first risk score module determining a first risk score for each of the plurality of data transactions;
an act of the second risk score module that is different from the first risk score module, the second risk score module being a short-term risk score module with respect to the first risk score module, receiving each of the first risk scores determined by the first risk score module as an input; and
an act of the second risk score module determining a second risk score based on the input first risk scores and one or more other risk parameters for each of the plurality of data transactions; and
based on the second risk score, performing, in real time, at least one of approving, rejecting, or causing to be further reviewed each of the data transactions, by a decision module of the computing system.

2. The computing system according to claim 1, wherein the first risk score module is trained using data that is collected for a first period of time.

3. The computing system according to claim 2, wherein the first period of time is at least one year.

4. The computing system according to claim 2, wherein the training data that is collected comprises one or more of chargeback data from an outside evaluator or review data from an outside review module.

5. The computing system according to claim 1, wherein the second risk score module is trained using data that is collected for a second period of time that is shorter than a first period of time that data that is used to train the first module is collected.

6. The computing system according to claim 5, wherein the second period of time is one month or less.

7. The computing system according to claim 5, wherein the training data that is collected comprises one or more of chargeback data from an outside evaluator or review data from an outside review module.

8. The computing system according to claim 1, further comprising:
an act of the second risk module receiving one or more risk parameters that are related to each of the plurality of data transactions and that are indicative of a risk level of each of the plurality of data transactions; and
an act of determining the second risk scores based in part on the input first risk scores for each of the plurality of data transactions and on the received one or more risk parameters scores.

9. The computing system according to claim 1, further comprising:
an act of calibrating the second risk scores based at least in part on the input first risk.

10. A method for determining a risk score for a plurality of data transactions, the method comprising:
a computing system comprising at least one processor performing an act of receiving a plurality of data transactions at a first risk score module;
the at least one processor performing an act of the first risk score module determining a first risk score for each of the plurality of data transactions, wherein the first risk core module is a long-term risk score module with respect to a second risk score module;

the at least one processor performing an act of the second risk score module that is different from the first risk score module receiving each of the first risk scores determined by the first risk score module as an input, wherein the second risk score module is a short-term risk score module with respect to the first risk score module; and the at least one processor performing an act of the second risk score module determining a second risk score based on the input first risk scores and one or more other risk parameters for each of the plurality of data transactions; and based on the second risk score, the at least one processor performing, in real time, at least one of approving, rejecting, or causing to be further reviewed each of the data transactions, by a decision module of the computing system.

11. The method according to claim 10, wherein the first risk score module is trained using data that is collected for a first period of time.

12. The method according to claim 11, wherein the first period of time is at least one year.

13. The method according to claim 10, wherein the second risk score module is trained using data that is collected for a second period of time that is shorter than a first period of time that data that is used to train the first module is collected.

14. The method according to claim 13, wherein the second period of time is one month or less.

15. The method according to claim 13, wherein the training data that is collected comprises one or more of chargeback data from an outside evaluator or review data from an outside review module.

16. The method according to claim 10, further comprising:

an act of the second risk module receiving one or more risk parameters that are related to each of the plurality of data transactions and that are indicative of a risk level of each of the plurality of data transactions; and an act of determining the second risk scores based in part on the input first risk scores for each of the plurality of data transactions and on the received one or more risk parameters scores.

17. The method according to claim 10, further comprising:

an act of calibrating the second risk scores based at least in part on the input first risk.

18. A computing system for determining a risk score for a plurality of data transactions, the computing system comprising:

at least one processor;

a computer readable hardware storage device having stored thereon computer-executable instructions which, when executed by the at least one processor, cause the computing system to instantiate the following:

a first risk score module, wherein the first risk score module is a long-term risk score module with respect to a second risk score module, that is configured to:

receive a plurality of data transactions; and determine a first risk score for each of the plurality of data transactions; and the second risk score module that is different from the first risk score module, wherein in the second risk score module is a short-term risk score module with respect to the first risk score module, and that is configured to:

receive each of the first risk scores determined by the first risk score module as an input; and determine a second risk score based on the input first risk scores and one or more other risk parameters for each of the plurality of data transactions; and a decision module that is configured to, based on the second risk score, in real time, at least one of approve, reject, or cause to be further reviewed each of the data transactions.

19. The computing system according to claim 18, wherein the computer readable hardware storage device has stored thereon computer-executable instructions which, when executed by the at least one processor, cause the computing system to instantiate the following:

a first training module that is configured to:

collect first data over a first period of time, the first data based in part on the first risk scores determined by the first risk score module; and use the collected first data to train the first risk score module; and a second training module that is configured to:

collect second data over a second period of time that is less than the first time period, the second data based in part on the second risk scores determined by the second risk score module; and use the collected second data to train the second risk score module.

20. The computing system according to claim 19, wherein the first time period is at least one year and the second time period is one month or less.

* * * * *